United States Patent
Chang (10) Patent No.: US 9,623,773 B2
(45) Date of Patent: Apr. 18, 2017

(54) RECLINING DEVICE FOR VEHICLE SEAT (71) Applicant: Hyundai Dymos Incorporated, Chungcheongnam-do (KR)

(72) Inventor: Seung Hun Chang, Gyeonggi-do (KR)

(73) Assignee: Hyundai Dymos Incorporated, Chungcheongnam-do (KR)

( * ) Notice: Subject to any disclaimer, the term of this patent is extended or adjusted under 35 U.S.C. 154(b) by 143 days.

(21) Appl. No.: 14/745,827

(22) Filed: Jun. 22, 2015

(65) Prior Publication Data

US 2015/0367758 A1 Dec. 24, 2015

(30) Foreign Application Priority Data

Jun. 20, 2014 (KR) .................. 10-2014-0075766

(51) Int. Cl.
*B60N 2/225* (2006.01)
*B60N 2/68* (2006.01)

(52) U.S. Cl.
CPC ........... *B60N 2/2252* (2013.01); *B60N 2/682* (2013.01)

(58) Field of Classification Search
CPC .............................. B60N 2/2252; B60N 2/682
See application file for complete search history.

(56) References Cited

U.S. PATENT DOCUMENTS

| | | | |
|---|---|---|---|
| 7,281,765 B2* | 10/2007 | Scholz | B60N 2/2254 297/362 |
| 2011/0138940 A1* | 6/2011 | Krueger | B60N 2/2252 74/60 |
| 2011/0140493 A1* | 6/2011 | Krueger | B60N 2/2252 297/362 |
| 2012/0019041 A1 | 1/2012 | Leconte et al. | |
| 2015/0054324 A1* | 2/2015 | Chang | B60N 2/2254 297/362 |
| 2016/0200222 A1* | 7/2016 | Desquesne | B60N 2/2252 297/354.12 |

FOREIGN PATENT DOCUMENTS

| | | |
|---|---|---|
| KR | 1020130101765 | 9/2013 |
| KR | 101382118 | 4/2014 |

\* cited by examiner

*Primary Examiner* — David E Allred
(74) *Attorney, Agent, or Firm* — Brinks Gilson & Lione (57) ABSTRACT a reclining device for a vehicle seat is provided by the present disclosure. The reclining device includes a bush having a serration is disposed between a plate protrusion of gear plate and a bearing. A cap inhibiting an input device and a spring from being disassembled is coupled to the gear plate by a weld. A disk-shaped retainer is coupled to a mobile flange by another weld.

6 Claims, 6 Drawing Sheets

ND DEVICE FOR VEHICLE SEAT

CROSS-REFERENCE TO RELATED APPLICATIONS

This application claims the benefit of Korean Patent Application No. 10-2014-0075766, filed on Jun. 20, 2014. The disclosure of the above application is incorporated herein by reference.

FIELD

The present disclosure generally relates to a reclining device for a vehicle seat.

BACKGROUND

The statements in this section merely provide background information related to the present disclosure and may not constitute prior art.

A seat provided in a vehicle includes a seatback supporting the upper body of an occupant, a seat cushion supporting the lower body of the occupant including the buttocks and the thighs, and a headrest supporting the back part of the head. A reclining device allowing the angle of the seatback to be adjusted in the forward and backward direction with respect to the seat cushion is disposed on the portion in which the seatback and the seat cushion is connected to each other.

The reclining device is divided into a manual reclining device, in which the occupant adjusts the angle of the seatback by manipulating a lever, and a power-type reclining device that automatically operates using power from a motor in response to a switch being manipulated. All reclining devices must have a strong coupling force between parts during the reclining operation in order to ensure that occupants are safe regardless of the operating scheme.

Figure 1:
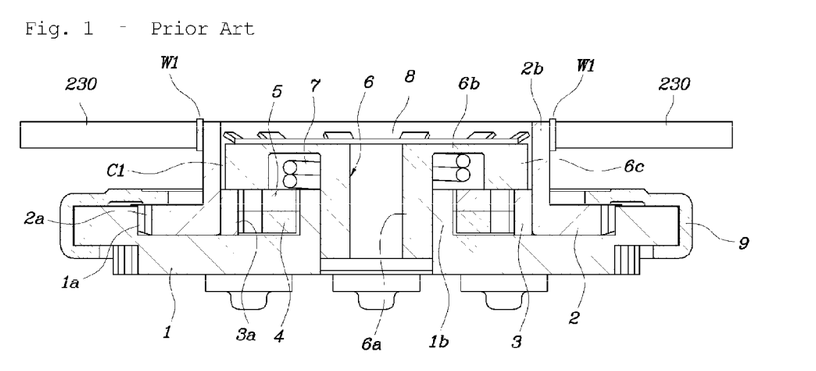
FIG. 1 is a cross-sectional view illustrating a reclining device having a cam structure of the prior art.
Figure 2:
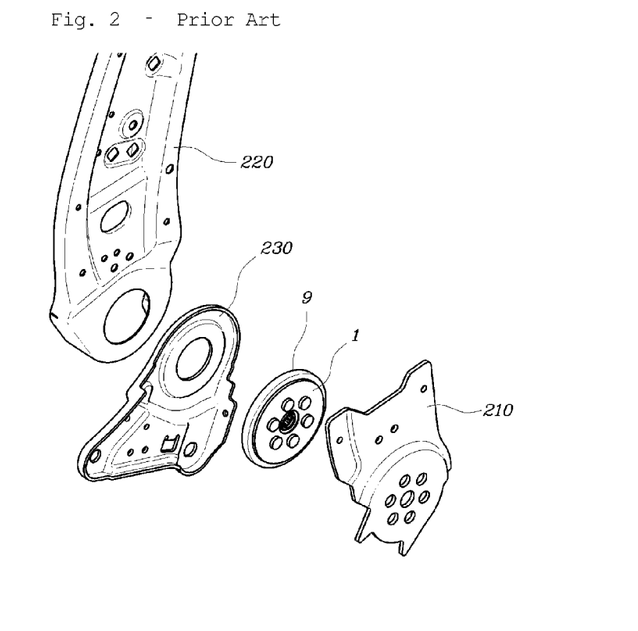
FIG. 2 is an exploded perspective view illustrating the back bracket and the cushion bracket of FIG. 1.

FIGS. 1 and 2 illustrate a reclining device of the related prior art having a cam structure. The reclining device includes a mobile flange 1, a gear plate 2, a bearing 3, first and second cams 4 and 5, an input device 6, a spring 7, a push nut 8, and a retainer 9. The mobile flange 1 has an internal gear 1a and a cylindrical flange protrusion 1b formed on the central portion thereof. The gear plate 2 has an external gear 2a meshing with the internal gear 1a and a cylindrical plate protrusion 2b formed on the central portion thereof. The bearing 3 is fitted into the plate protrusion 2b. One portion of the bearing 3 is supported on the mobile flange 1, and the outer circumference of the bearing 3 adjoins the inner circumference of the plate protrusion 2b. The first cam 4 and the second cam 5 are disposed in the space between the outer circumference of the flange protrusion 1b and the inner circumference of the bearing 3 such that the first cam 4 and the second cam 5 overlap each other. The input device 6 has a central protrusion fitted into the flange protrusion 1b, a cover part 6b bent outward from one end of the device protrusion 6a, and a support 6c bent from the distal end of the cover part 6b in the direction of the mobile flange 1. The spring 7 is positioned in the space between the distal end of the flange protrusion 1b and the cover part 6b. Both ends of the spring 7 are fitted into the first and second cams 4 and 5. The push nut 8 is fitted into the plate protrusion 2b and adjoins the cover part 6b of the input device, thereby maintaining the assembled state of the input device 6. The retainer 9 couples the mobile flange 1 and the gear plate 2 to each other by surrounding the outer circumference of the mobile flange 1 and the gear plate 2.

The recliner shaft is coupled to the central protrusion 6a of the input device 6. The support 6c of the input device 6 adjoins both the bearing 3 and the second cam 5. The push nut 8 is interference-fitted into the plate protrusion 2b and fixedly adjoins the cover part 6b of the input device 6.

The mobile flange 1 is coupled to the back bracket 210, which is coupled to the seatback frame 220. The gear plate 2 is coupled to the cushion bracket 230, which is coupled to a seat cushion back frame (not shown).

Here, the gear plate 2 and the cushion bracket 230 are coupled to each other by means of a weld W1 in order to increase coupling force. Most the heat produced during welding is transferred to the bearing 3 through the plate protrusion 2b, which may damage a coated surface 3a of the bearing 3.

The reclining device of the related prior art is configured such that the outer circumference of the bearing 3 directly adjoins the inner circumference of the plate protrusion 2b of the gear plate 2 and the first and second cams 4 and 5 adjoin the inner circumference of the bearing 3. When the gear plate 2 and the cushion brackets 230 are coupled to each other by means of the weld W1, the heat produced during the welding is transferred to the bearing 3 through the plate protrusion 2b, whereby the coated surface 3a of the bearing 3 adjoining the first and second cams 4 and 5 may be damaged by the welding heat.

The inner circumference of the bearing 3 forms the coated surface 3a in order to facilitate the operation of the first and second cams 4 and 5. If the coated surface 3a of the bearing 3 is damaged by high-temperature welding heat the performance of the first and second cams 4 and 5 may be degraded.

In addition, in the reclining device of the related prior art, a gap C1 is present between the inner circumference of the plate protrusion 2b and the push nut 8. This allows a coating solution to enter through the gap C1, thereby causing possible contamination of the bearing 3 and the first and second cams 4 and 5. This consequently may degrade the performance of the operation of the bearing 3 and the first and second cams 4 and 5.

Figure 3:
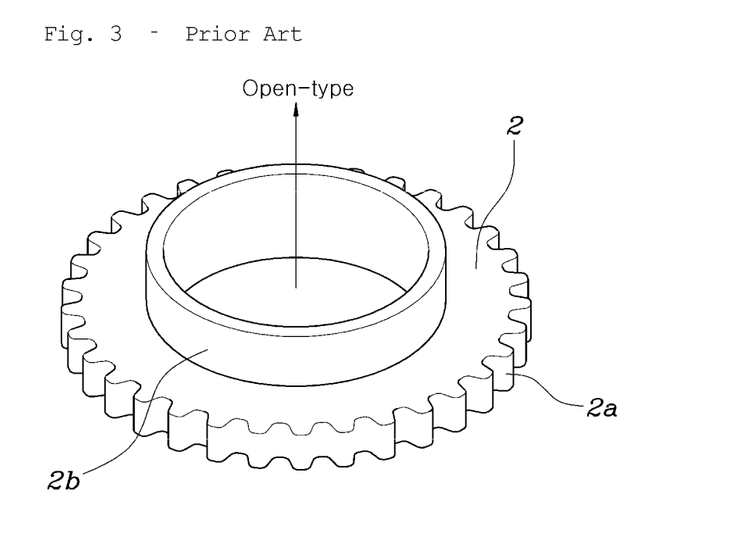
FIG. 3 is a perspective cross-sectional view illustrating the gear plate and the retainer of the reclining device of the prior art.

Furthermore, since the plate protrusion 2b of the gear plate 2 and the cushion bracket 230 are coupled to each other by means of the weld W1, the load of the seat and the occupant is transferred to the plate protrusion 2b through the cushion bracket 230. As illustrated in FIGS. 1 and 3, in the reclining device of the related art, the gear plate 2 is an open-type in which the plate protrusion 2b is open without any support structure. Consequently, the gear plate 2 including the plate protrusion 2b may be easily twisted, thus reducing the endurance of the reclining device.

Figure 4:
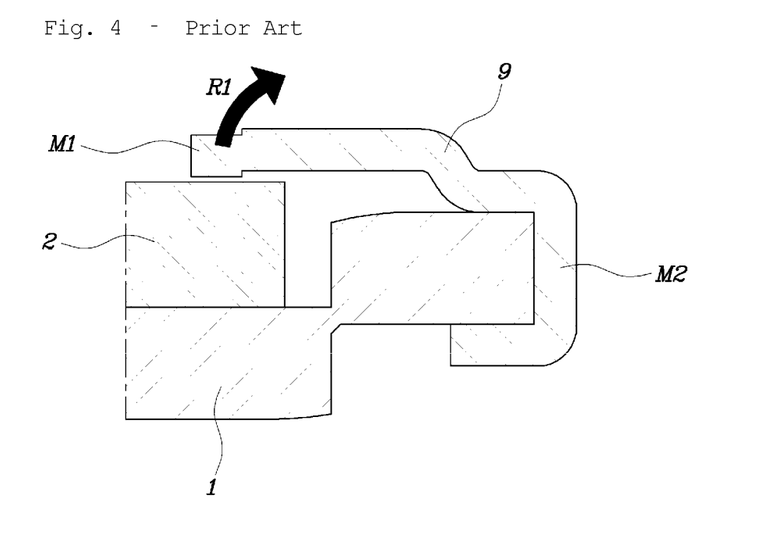
FIG. 4 is a fragmentary cross-sectional view illustrating the gear plate and the retainer of the reclining device of the prior art.
Figure 5:
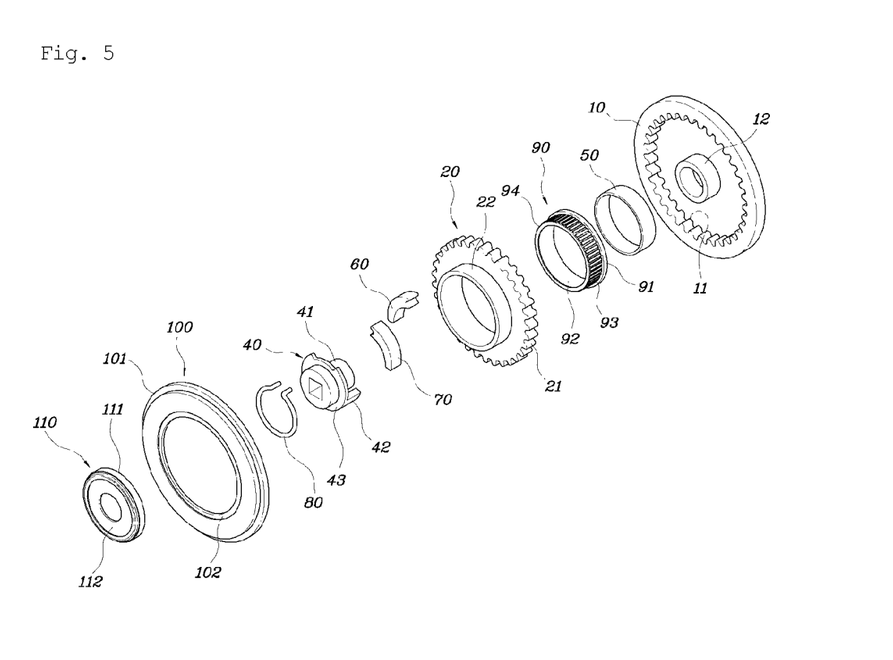
FIG. 5 is an exploded perspective view illustrating a reclining device having a bush, a cap, and a retainer according to one form of the present disclosure.
Figure 6:
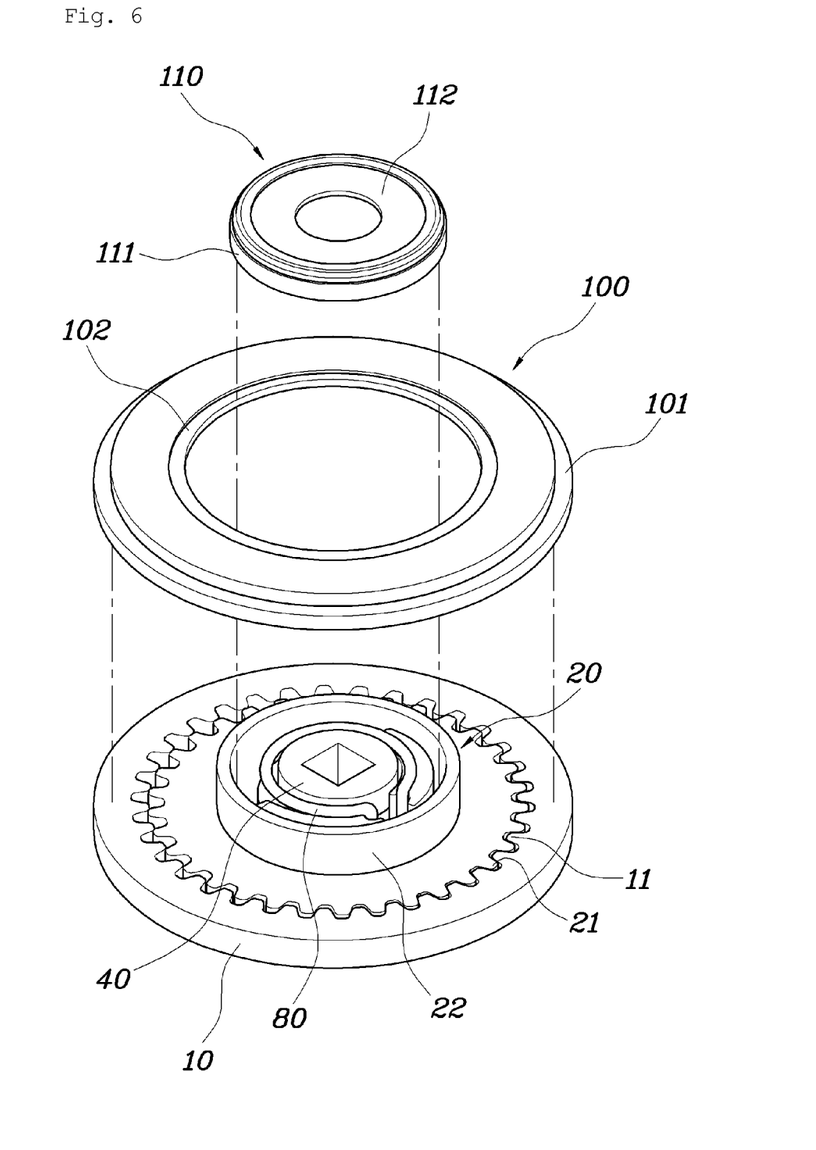
FIG. 6 is an exploded perspective view illustrating the bush, a cap, and retainer of FIG. 5.
Figure 7:
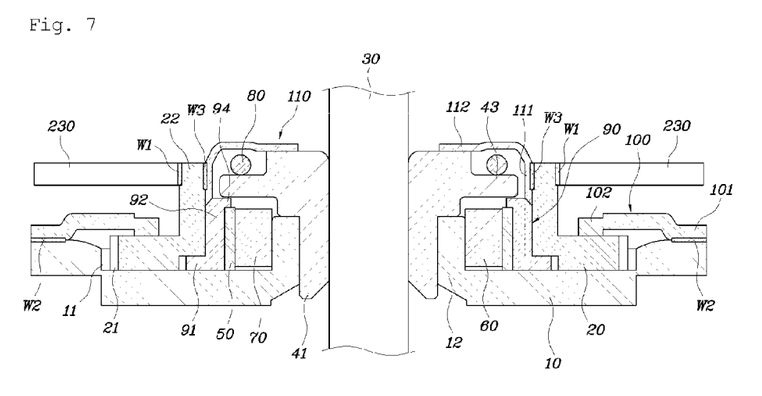
FIG. 7 is an assembled cross-sectional view of the reclining device illustrated in FIG. 8.
Figure 8:
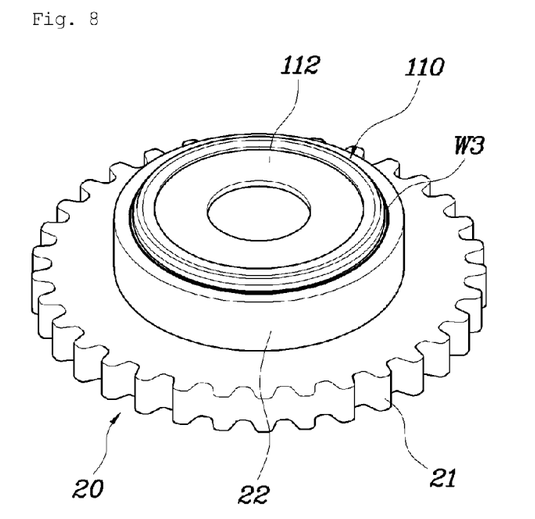
FIG. 8 is an assembled perspective view of the reclining device illustrated in FIG. 7, in which the cap is coupled to the gear plate.
Figure 9:
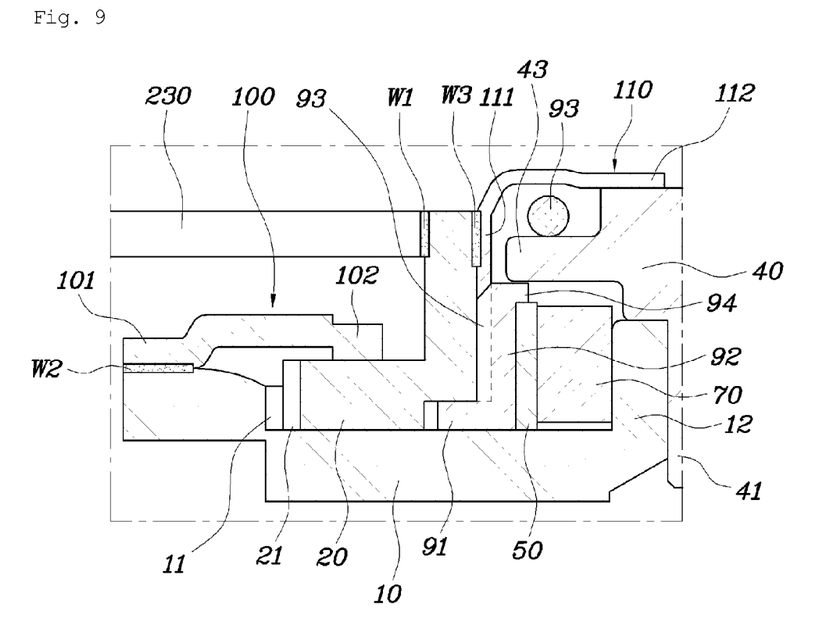
FIG. 9 is an enlarged view of the key parts of the reclining device illustrated in FIG. 7.

In addition, as illustrated in FIGS. 1 and 4, the reclining device of the related prior art is configured such that the retainer 9 couples the mobile flange 1 and the gear plate 2 by surrounding both the outer circumference of the mobile flange 1 and the outer circumference of the gear plate 2. When the gear plate 2 is subjected to twisting, the portion M1 of the retainer 9 supporting the gear plate 2 warps as indicated by an arrow R1. The warped portion M1 causes the retainer 9 to become loose. This consequently decreases the coupling force of the retainer 9, thereby weakening the coupling between the mobile flange 1 and the gear plate 2.

Furthermore, since the retainer 9 of the related prior art requires a portion M2 surrounding both the outer circumference of the mobile flange 1 and the outer circumference of the gear plate 2, an additional amount of time is required to shape and form the retainer, thus increasing fabrication costs and also increasing the weight of the retainer.

The information disclosed in the Background of the present disclosure section is only for the enhancement of understanding of the background of the present disclosure, and should not be taken as an acknowledgment or as any form of suggestion that this information forms a prior art that would already be known to a person skilled in the art.

SUMMARY

Accordingly, the present disclosure provides a reclining device for a vehicle seat, in which a bush is disposed between a plate protrusion of a gear plate and a bearing, such that the bush can absorb part of heat generated from welding of the gear plate to the cushion bracket. This can reduce the amount of the welding heat transferred to the bearing, thereby reducing the possibility of damaging a coated surface of the bearing caused by the welding heat.

The present disclosure also reduces the contact area between the plate protrusion of the gear plate and the bush, thereby reducing the transfer of the welding heat generated from the welding of the gear plate to the cushion bracket to the bearing through the bush. This can further reduce the possibility of damaging the coated surface of the bearing, thereby inhibiting the performance of the operation of the reclining device.

The present disclosure is also intended to increase the firmness of the structure in which the bearing is disposed by employing a bearing-catching structure on the bush. In particular, the inner space in which the bush, the bearing, and the first and second cams are disposed is closed using a cap coupled to the gear plate and by maintaining a hermetic seal between the gear plate and the cap. This can inhibit the bush, the bearing, and the first and second cams from being contaminated by a coating solution.

The present disclosure is also intended to convert the plate protrusion to a closed-type by directly coupling the plate protrusion of the gear plate to the cap, and increase the twisting strength of the gear plate including the plate protrusion using a plate protrusion support structure produced by the cap, thereby increasing the endurance of the reclining device.

The present disclosure is also intended to increase the coupling force of the retainer by improving the shape and the coupling structure of the retainer that is directly coupled to the mobile flange while supporting the gear plate. This can increase the coupling force between the mobile flange and the gear plate, thereby improving the performance of the reclining device. This may also reduce the costs and the weight of the reclining device.

According to one aspect of the present disclosure, a reclining device for a vehicle seat includes: a cam disposed between a mobile flange and a gear plate; a bearing having a coated surface adjoining the cam; a bush disposed between the gear plate and the bearing, wherein the bush absorbs part of welding heat generated during welding of the gear plate to the cushion bracket, thereby reducing an amount of the welding heat transferred to the bearing; an input device extending through the gear plate and covering the cam and the bearing; and a cap, an outer portion of the cap being coupled to the gear plate by welding, and an inner portion of the cap adjoining the input device, wherein the cap maintains a space between the input device and the gear plate in a hermetically closed state and increases the strength of the gear plate.

The reclining device may further include a disk-shaped retainer having a hole in a central portion thereof, wherein the retainer is coupled to the mobile flange such that an outer portion of the retainer is in surface contact with one surface of the mobile flange, and an inner portion of the retainer is in surface contact with one surface of the gear plate, whereby the retainer is able to press the gear plate against the mobile flange.

The bush may include a base fixedly fitted between the mobile flange and the gear plate and a cylindrical part bent from the base. An outer circumference of the cylindrical part adjoins a plate protrusion of the gear plate, and an inner circumference of the cylindrical part adjoins an outer circumference of the bearing.

The cap may include: a side coupling part coupled to the gear plate in surface contact by welding; and a disk-shaped closing part bent from the side coupling part, wherein the closing part closely adjoins a portion of the input device by surface contact when the side coupling part is coupled to the gear plate by welding, thereby closing the space between the input device and the gear plate.

The bush may further include a serration on an outer circumference of the cylindrical part along a circumferential direction of the cylindrical part, the serration reducing a contact area between the cylindrical part and the plate protrusion.

The bush may further include a catch flange bent from a distal end of the cylindrical part in a direction of a center of the bush, wherein one end of the bearing is fixedly disposed on the catch flange.

According to the present disclosure, the bush is disposed between the plate protrusion of the gear plate and the bearing, and the serration adjoining the plate protrusion is formed on the cylindrical part of the bush. This structure can reduce the transfer of high-temperature welding heat generated during the welding of the gear plate to the cushion bracket to the bearing. This can consequently inhibit the coated surface of the bearing from being damaged by the welding heat, thereby further improving the performance of the operation of the first and second cams and the performance of the operation of the reclining device.

In addition, according to the present disclosure, the bearing is more firmly disposed using the catch flange formed on the bush, thereby improving the performance of the operation of the first and second cams and the performance of the operation of the reclining device.

Furthermore, according to the present disclosure, it is possible to increase the twisting strength of the gear plate using the cap coupled to the gear plate by welding, increase the coupling force of the retainer by inhibiting the retainer from becoming loose, and inhibit the bearing, the first and second cams, and the bush from being contaminated by a coating solution by maintaining the space between the input device and the gear plate in a hermetically closed state. It is therefore possible to further improve the performance of the operation of the reclining device.

In addition, according to the present disclosure, the disk-shaped retainer coupled to the mobile flange by welding can increase the coupling force between the mobile flange and the gear plate as well as the endurance of the reclining device. This can consequently reduce the fabrication costs and the weight of the retainer.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in greater detail to a reclining device for a vehicle seat according to one form of the present disclosure in conjunction with the accompanying drawings.

As illustrated in FIGS. 5 to 9, the reclining device for a vehicle seat according to one form of the present disclosure includes a mobile flange 10, a gear plate 20, an input device 40, a bearing 50, first and second cams 60 and 70, and a spring 80. The mobile flange 10 has an internal gear 11 and a cylindrical flange protrusion 12 formed on the central portion thereof. The gear plate 20 has an external gear 21 meshing with the internal gear 11 and a cylindrical plate protrusion 22 formed on the central portion thereof. The input device 40 has a central protrusion 41 coupled to a recliner shaft 30, the recliner shaft 30 extending through the central protrusion 41, and a device protrusion 42 integrally formed on an outer portion of the central protrusion 41. The bearing 50 extends through the gear plate 20, and is fitted between the outer portion of the device protrusion 42 and the plate protrusion 22 of the gear plate 20. The first and second cams 60 and 70 are fitted between an outer portion of the flange protrusion 12 and the bearing 50. The spring 80 is coupled to the first and second cams 60 and 70, with both ends of the spring 80 being respectively fitted into the first and second cams 60 and 70.

As described above with reference to FIG. 2, the mobile flange 10 is coupled to the back bracket 210, which is coupled to a seatback frame 220. The gear plate 20 is coupled to a cushion bracket 230, which is coupled to a seat cushion back frame (not shown).

The input device 40 further has a disk part 43 protruding outward from the central protrusion 41. The device protrusion 42 is connected to the disk part 43.

The spring 80 closely adjoins one surface of the disk part 43, and both ends of the spring 80 extend through the disk part 43 and are respectively fitted into the first and second cams 60 and 70.

The central protrusion 41 of the input device 40 extends through the plate protrusion 12 of the mobile flange 10. The disk part 43 of the input device 40 adjoins one end of a bush 90, which will be described later, and covers the bearing 50 and the first and second cams 60 and 70.

The plate protrusion 22 of the gear plate 20 is coupled to the cushion bracket 230 by means of a weld W1 in order to increase the coupling force therebetween. When a large amount of high-temperature welding heat is transferred to the bearing 50 through the plate protrusion 22, a coated surface 51 (the inner circumference) of the bearing 50 adjoining the first and second cams 60 and 70 may be damaged. A damaged coated surface 51 degrades the performance of the first and second cams 60 and 70, thereby degrading the performance of the reclining device.

The structure according to the present disclosure can reduce the transfer of high-temperature welding heat generated during the coupling between the gear plate 20 and the cushion bracket 230 by means of the weld W1 to the bearing 50. This can consequently inhibit the coated surface 51 of the bearing 50 adjoining the first and second cams 60 and 70 from being damaged by the welding heat.

Specifically, the reclining device according to the present disclosure has the bush 90 disposed between the plate protrusion 22 of the gear plate 20 and the bearing 50. The bush 90 absorbs part of the welding heat generated during the welding of the gear plate 20 to the cushion brackets 230 as indicated by the weld W1. This can consequently reduce the transfer of the welding heat to the bearing 50, thereby reducing damage of the coated surface 51 of the bearing adjoining 50 the first and second cams 60 and 70 caused by the welding heat.

The bush 90 according to the present disclosure includes a base 91 fixedly fitted between the mobile flange 10 and the gear plate 20 and a cylindrical part 92 bent from the base 91. The bush 90 is configured such that the outer circumference of the cylindrical part 92 adjoins the inner circumference of the plate protrusion 22 of the gear plate 20 and the inner circumference of the cylindrical part 92 adjoins the outer circumference of the bearing 50.

In addition, according to the present disclosure, a serration 93 is formed on the outer circumference of the cylindrical part 92 of the bush 90 along the circumferential direction of the cylindrical part 92. The serration 93 reduces the contact area between the cylindrical part 92 and the plate protrusion 22.

The serration 93 may be in linear contact with the inner circumference of the plate protrusion 22. The serration 93 may further have a surface contact structure having a narrow width as long as the serration 93 reduces the contact area between the cylindrical part 92 and the plate protrusion 22.

Since the reclining device of the related art is configured such that the plate protrusion of the gear plate directly adjoins the bearing, there is the disadvantage in that most welding heat generated during the welding of the gear plate to the cushion bracket is transferred to the bearing through the plate protrusion, thereby increasing the possibility of damaging the coated surface of the bearing adjoining the first and second cams. In contrast, in the reclining device according to the present disclosure, the bush 90 disposed between the plate protrusion 22 of the gear plate 20 and the bearing 50 can absorb part of the welding heat generated during the welding of the gear plate 20 to the cushion bracket 230 as indicated by the weld W1. This can consequently reduce the transfer of the welding heat to the bearing 50, thereby reducing the possibility of the coated surface 51 of the bearing 50 being damaged by the welding heat.

In addition, in the reclining device according to the present disclosure, the serration 93 formed on the cylindrical part 92 of the bush 90 can reduce the contact area between the cylindrical part 92 and the plate protrusion 22 of the gear plate 20, thereby further reducing the transfer of the welding heat to the bearing 50.

Furthermore, according to the present disclosure, a catch flange 94 is formed integrally on the distal end of the cylindrical part 92 of the bush 90. The catch flange 94 is bent in the direction of the center of the bush 90. One end of the bearing 50 is fixedly disposed on the catch flange 94.

When the bearing 50 is fitted between the first and second cams 60 and 70 and the bush 90, one end of the bearing 90 (corresponding to the upper end in the figure of FIG. 7) is fixed by the catch flange 94 formed on the distal end of the bush 90, and the other end of the bearing 90 (corresponding to the figure of FIG. 7) is fixed by the mobile flange 10. With this configuration, the bearing 50 is more firmly disposed.

In addition, the reclining device according to the present disclosure further includes a retainer 100 coupling the mobile flange 10 and the gear plate 20.

In one form, the retainer 100 is in the shape of a disk having a hole in the central portion thereof. An outer portion 101 of one surface of the retainer 100 is in surface contact with and coupled to one surface of the mobile flange 10 by means of a weld W2. An inner portion of one surface of the retainer 100 is in surface contact with one surface of the gear plate 2.

With this configuration, when the outer portion 101 of the retainer 100 is coupled to the mobile flange 10 by means of the weld W2, the inner portion 102 presses the gear plate 20 against the mobile flange 10, thereby coupling the mobile flange 10 to the gear plate 20.

When the retainer 100 is in the disk shape as above, the portion surrounding both the mobile flange and the outer circumference of the gear plate of the prior art may not be required. This can consequently improve productivity by reducing fabrication time while reducing costs and the weight by reducing the amount of a material used.

In addition, according to the present disclosure, the retainer 100 is coupled to the mobile flange 10 by means of the weld W2. This structure has the advantage of the increased coupling force of the retainer 100, which is greater than the coupling force of the retainer of the related art that is simply fitted into the outer circumference of the mobile flange and the outer circumference of the gear plate. This can consequently increase the coupling force between the mobile flange 10 and the gear plate 20 as well as the endurance of the reclining device.

Furthermore, the reclining device according to the present disclosure further includes a cap 110 inhibiting the bearing 50, the first and second cams 60 and 70, the input device 40, and the spring 80 from being disassembled.

The outer portion of the cap 110 is coupled to the gear plate 10 by means of a weld W3, in which case the inner portion of the cap 110 is in surface contact with the input device 40. The cap 110 disposed as above closes the space between the input device 40 and the gear plate 20, thereby maintaining the space in a hermetically sealed state. The cap 110 can also increase the strength of the gear plate 20.

For this, the cap 110 includes a side coupling part 111 and a disk-shaped closing part 112. The side coupling part 111 is coupled to the inner circumference of the plate protrusion 22 of the gear plate 20, and is in surface contact with the inner circumference of the plate protrusion 22. The closing part 112 is bent from the side coupling part 111. When the side coupling part 111 is coupled by welding as indicated by the weld W3, the closing part 112 comes into close surface contact with one portion of the input device 40, thereby closing the space between the input device 40 and the gear plate 20.

The side coupling part 111 of the cap 110 is coupled to the plate protrusion 22 of the gear plate 20 by means of the weld W3. This structure can increase the twisting strength of the plate protrusion 22, thereby improving the endurance of the reclining device.

Since the plate protrusion 22 of the gear plate 20 is coupled to the cushion bracket 230 by means of the weld W1, the load of the seat and an occupant is transferred to the plate protrusion 22 through the cushion bracket 230. In the reclining device of the prior art, the gear plate is an open-type, as shown in FIG. 4, in which the plate protrusion 22 is open without any support structure. Consequently, the gear plate including the plate protrusion is weak and has the disadvantage of being twisted, thus the endurance of the reclining device is reduced.

In contrast, in the reclining device according to the present disclosure, the side coupling part 111 of the cap 110 is coupled to the plate protrusion 22 by means of the weld W3, such that the plate protrusion 22 is converted from an open-type to a closed-type by the closing part 112 of the cap 110. Since the plate protrusion 22 of the gear plate 20 according to the present disclosure is coupled to the side coupling part 111 of the cap 110 by means of the weld W3, the twisting strength of the plate protrusion 22 is increased. This also provides an advantage of the increased endurance of the reclining device.

In addition, the increase in the strength of the plate protrusion 22 as described above can inhibit the retainer from becoming loose. This can lead to an advantage of increased coupling force of the retainer.

Furthermore, the closing part 112 of the cap 110 according to the present disclosure serves to close the space between the input device 40 and the gear plate 20, thereby maintaining the space in a hermetically sealed state. The closed space can inhibit a coating solution from flowing into the space in which the bearing 50, the first and second cams 60 and 70, and the bush 90 are disposed, thereby inhibiting the bearing 50, the first and second cams 60 and 70, and the bush 90 from being contaminated by the coating solution. Accordingly, it is possible to further improve the performance of the operation of the reclining device.

As described above, the reclining device according to the present disclosure has the bush 90 disposed between the plate protrusion 22 of the gear plate 20 and the bearing 50, such that the bush 90 can absorb part of the welding heat generated during welding of the gear plate 20 to the cushion bracket 230 as indicated by the weld W1. This can consequently reduce the amount of the welding heat transferred to the bearing 50, thereby reducing the possibility of damaging the coated surface 51 of the bearing 50 adjoining the first and second cams 60 and 70 caused by the welding heat. Advantageously, it is possible to inhibit the welding heat from damaging the coated surface 51, and degrading the performance of the first and second cams 60 and 70 and the performance of the reclining device.

In addition, the present disclosure can reduce the contact area between the cylindrical part 92 of the bush 90 and the plate protrusion 22 using the serration 93 formed on the cylindrical part 92, thereby further reducing the amount of the heat transferred to the bearing 50.

Furthermore, according to the present disclosure, the bearing 50 can be more firmly disposed using the catch flange 94 of the bush 90. It is therefore possible to advantageously improve the performance of the operation of the first and second cams 60 and 70 as well as the performance of the operation of the reclining device.

In addition, according to the present disclosure, the retainer 100 is in the shape of a disk, which is coupled to the mobile flange 10 by means of the weld W2. This can consequently increase the coupling force between the mobile flange 10 and the gear plate 20 and the endurance of the reclining device. It is also possible to advantageously reduce the fabrication and manufacturing costs and reduce the weight of the retainer 100.

Furthermore, according to the present disclosure, the cap 110 inhibits the input device 40 and the spring 80 from being disassembled is coupled to the gear plate 20 by means of the weld W3. This can advantageously further increase the coupling force between the cap 110 and the gear plate 20.

In addition, according to the present disclosure, the cap 110 is coupled to the gear plate 20 by means of the weld W3, the twisting strength of the gear plate 20 is increased. This can advantageously improve the endurance of the reclining device.

Furthermore, according to the present disclosure, since the strength of the gear plate 20 is increased due to the coupling between the gear plate 20 and the cap 110 by means of the weld W3, there are advantages in that the retainer 100 can be inhibited from becoming loose and the coupling force of the retainer 100 can be increased.

In addition, according to the present disclosure, the closing part 112 of the cap 110 coupled to the gear plate 20 by means of the weld W3 can maintain the space between the input device 40 and the gear plate 20 in a hermetically closed state. This can consequently inhibit the coating solution from entering the space in which the bearing 50, the first and second cams 60 and 70, and the bush 90 are disposed, thereby inhibiting the bearing 50, the first and second cams 60 and 70, and the bush 90 from being contaminated by the coating solution. Advantageously, it is possible to further improve the performance of the operation of the reclining device.

Although the forms of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. A reclining device for a vehicle seat comprising:
a cam disposed between a mobile flange and a gear plate;
a bearing having a coated surface adjoining the cam;
a bush disposed between the gear plate and the bearing, wherein the bush absorbs part of welding heat generated during welding of the gear plate to the vehicle seat, thereby reducing an amount of the welding heat transferred to the bearing;
an input device extending through the gear plate and covering the cam and the bearing; and
a cap, an outer portion of the cap being coupled to the gear plate by welding, and an inner portion of the cap adjoining the input device, wherein the cap maintains a space between the input device and the gear plate in a hermetically closed state and increases the strength of the gear plate; and
wherein the bush comprises a round cylindrical part and a base disposed protruding radially outward from the round cylindrical part and extending between the mobile flange and the gear plate,
wherein an outer circumference of the cylindrical part of the bush engages a plate protrusion of the gear plate, and an inner circumference of the cylindrical part of the bush contacts an outer circumference of the bearing.

2. The reclining device according to claim 1, further comprising a disk-shaped retainer defining a hole in a central portion thereof, wherein the disk-shaped retainer is coupled to the mobile flange such that an outer portion of the retainer is in surface contact with one surface of the mobile flange, and an inner portion of the retainer is in surface contact with one surface of the gear plate, whereby the retainer is able to press the gear plate against the mobile flange.

3. The reclining device according to claim 1, wherein the cap comprises:
a side coupling part coupled to the gear plate by welding; and
a disk-shaped closing part extending from the side coupling part, wherein the disk-shaped closing part engages a portion of the input device when the side coupling part is coupled to the gear plate by welding, thereby closing the space between the input device and the gear plate.

4. The reclining device according to claim 1, wherein the bush further comprises a serration on the outer circumference of the cylindrical part along a circumferential direction of the cylindrical part, wherein the serration on the outer circumference reduces a contact area between the cylindrical part and the plate protrusion.

5. The reclining device according to claim 1, wherein the bush further comprises a catch flange extending from a distal end of the cylindrical part in a direction of a center of the bush,
wherein one end of the bearing is disposed against the catch flange.

6. The reclining device according to claim 1, wherein the bush comprises a serration on an outer circumference thereof adjoining an inner circumference of the gear plate, the serration reducing a contact area between the outer circumference of the bush and an inner circumference of the plate protrusion.

\* \* \* \* \*